Patented Apr. 24, 1934

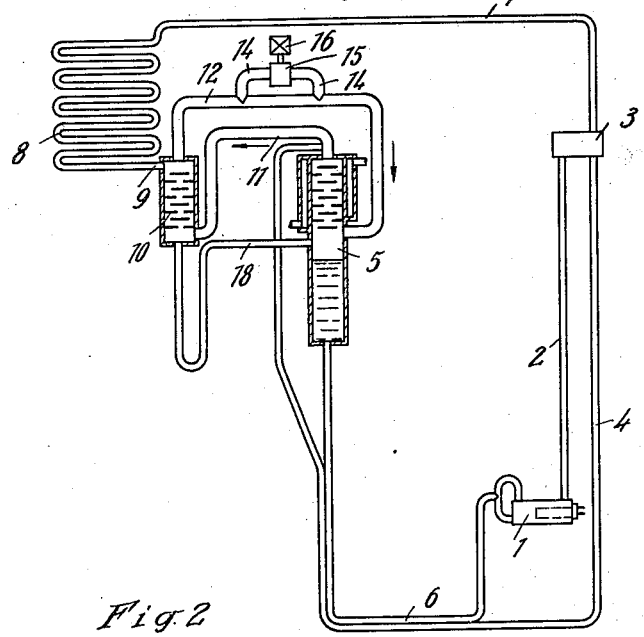

1,956,402

UNITED STATES PATENT OFFICE 1,956,402

ABSORPTION REFRIGERATING APPARATUS

Paul Scholl, Berlin-Siemensstadt, and Carl Kühnel, Berlin-Charlottenburg, Germany, assignors to Siemens-Schuckertwerke Aktiengesellschaft, Berlin-Siemensstadt, Germany Application February 27, 1932, Serial No. 595,486
In Germany March 4, 1931

11 Claims. (Cl. 62—119.5)

REISSUED

Our invention relates to absorption refrigerating apparatus, and more particularly to a device for producing by means of a nozzle a circulation of gas in absorption refrigerating apparatus of the continuous type.

It is well known in the art to produce in absorption machines of the refrigerating type in which different gas pressures prevail a circulation of gas in a system of lower pressure by means of a nozzle which is disposed in the direction of the desired flow of gas and through which the gas expelled at higher pressure is introduced. It is true that the mechanical driving devices for the circulation of gas might be eliminated by employing the above method, but the known devices have the disadvantage that the gas flowing through the nozzle is lost to the production of cold. Moreover, such devices can only be utilized in such absorption apparatus in which the gas presure is not completely equalized.

Our invention has for its object to overcome the foregoing disadvantages by providing an electromechanical device in an absorption refrigerating apparatus of the continuous type for the production of the gas pressure necessary for the operation of the nozzle. By the use of a device according to our invention, it is possible to utilize the entire amount cooling agent contained in an absorption refrigerating apparatus for the production of cold. Furthermore, it is not necessary to develop the amount of heat which is otherwise required for the production of the pressure. Besides, in such continuous operation absorption apparatus which are operated with an inert gas, a further advantage is obtained in that the circulation of gas may also be brought about by means of a nozzle, if the space containing the inert gas to be circulated be subjected to the same or higher pressure than the other spaces of the absorption apparatus.

Should the gas, which is required for the operation of the nozzle be taken from a point near the nozzle, very short conduits are necessary, so that on the one hand the resistance to the flow of nozzle gas is considerably decreased, and on the other hand the pressure prevailing at the point at which the conduit—in which the electromechanical gas pressure generating means is inserted—leaves the conduit through which the gas flows, is lower than the pressure prevailing at the nozzle, which is particularly favorable for maintaining the flow of gas to be circulated. The end portion of the conduit containing the gas pressure generating means is preferably designed in the form of a nozzle. It is particularly advantageous to connect the nozzle with a closed gas space, the volume of which may be periodically varied by the electromechanical pressure generator. This may be obtained by employing a diaphragm or oscillating disc for varying the volume of the closed gas space, the diaphragm being so arranged as to close the space at one side thereof. The diaphragm may be operated by an electromagnet energized by an alternating current. In order to prevent a loss of energy by the formation of eddies in the circulation of the gas, a centrally perforated disc is preferably disposed in front of the nozzle close to the outlet thereof through which disc the air stream emitted from the nozzle passes.

The accompanying drawing illustrates several embodiments of our invention. In the drawing:

Figure 1 represents a continuous operation absorption apparatus of the refrigerating type in which a pressure equalizing inert gas is mixed with the cooling agent in the evaporator and absorber.

Fig. 2 represents in larger scale a detail illustration of the circulating nozzle arrangement 14, 15, 16 in Fig. 1, and Figs. 3 and 4 represent in similar larger scale modifications of the nozzle arrangement shown in Fig. 2.

Referring to Fig. 1, the gas expelled from the rich absorption solution in the generator 1—which may be of a similar type as set out and claimed in the copending application Serial No. 377,028—passes through a rising conduit 2 into a gas separator 3 into which also the weak solution is entrained with the gas. The solution is discharged through a conduit 4 into the upper part of the absorber 5 surrounded by a water cooling jacket where it again becomes rich in gas on flowing down over the baffle plates and thence back to the generator 1 through a conduit 6 which forms with the conduit 4 a heat exchanger. The fluid generated in the generator 1 passes through gas pipe 7 into an air-cooled condenser 8, which consists of a conduit, suitably coiled, for instance in the manner shown. The refrigerant is liquefied therein. The condensate flows from the condenser through conduit 9 into the evaporator 10, also provided with baffle elements, and thus the condensate is again evaporated. The evaporator 10 and the absorber 5 are so connected to each other by the conduits 11 and 12 as to form a fluid circulating system.

In order to convey the gas mixture from the evaporator 10 to the absorber 5 and to cause the gas mixture to pass through these vessels in counter-flow to the downwardly flowing liquid, an injector nozzle 13, illustrated in detail in Figure 2, is disposed within the conduit 12 and supplied with gas through a conduit 14. The increase in pressure necessary for this purpose is effected by means of a small compressor 15, inserted in the conduit 14 and driven by a small synchronous motor 16. The motor 16 is disclosed in Figure 2 as being arranged exteriorly of the conduit 14; it may also be disposed within the same, i. e., completely within the gas-filled space. The point at which the conduit 14 leaves the conduit 12 is located near the outlet of the nozzle 13. In front of and close to the mouth of nozzle 13 a disc 14 is disposed within the pipe 12, and provided with a central opening corresponding to the cross-section of the gas jet emanating from the nozzle. As a result of the kinetic energy of the gas particles flowing through the disc, the gas mixture contained in the conduit 12 is caused to circulate. The air drawn in by the nozzle 13 flows along the outer rim of the nozzle outlet as indicated by the arrows, whereas in the direction of the jet emanating from the nozzle it is blown off, so that a substantially continuous air current results. A further intermediate conduit 18 arranged between the evaporator and absorber serves to conduct excessive amounts of liquid operating medium from the evaporator back into the absorption system.

In the modification shown diagrammatically in Figure 3, the nozzle is connected with a gas chamber, the volume of which can be varied periodically.

Here, the nozzle outlet 13 is connected to the casing 20 through the conduit 19. A flexible diaphragm 21 is disposed within the casing 20 in such a manner as to oscillate upon energization of the two alternating current electromagnets 22, likewise arranged in the casing 20, in accordance with the frequency of the alternating current. According to a well-known law of physics, the suction of the air occurs along the rim of the nozzle mouth in the direction of the arrows pointing towards the nozzle mouth, whereas in the direction of the outgoing arrows the air is forced out of the central portion of the nozzle mouth. A formation of eddies in the flow of gas is prevented also in this case by the arrangement of the centrally perforated disc 17, so that a continuous flow of gas is brought about in the conduit 12 in the direction of the dotted arrow.

Figure 4 shows a particularly advantageous modified form of the device of Figure 3. The nozzle 13 is disposed within a chamber 23 directly in the path within which the flow of gas changes direction, in which case the downwardly extending conduit serves simultaneously the purpose of the perforated disc 17 of Figs. 2 and 3. The upper part of the chamber 23 is designed at the same time so as to form a closed gas space 24, the volume of which is varied by means of the diaphragm 21 oscillated by the alternating current electromagnets 22. The direction of flow of gas is again indicated by the direction of the arrows. By interposing the chamber 23 between the gas space 24 and conduit 12, an increase in cross-section in front of the nozzle is effected and therefore a particularly favorable gas supply to the nozzle is obtained.

We claim as our invention:

1. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit for emitting a gas jet to direct said gaseous agents in a predetermined direction of circulation, and an electrically operated mechanical means connected with said nozzle for forcing a portion of said gas travelling in said conduit through said nozzle to produce said jet.

2. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a second conduit branching off said first-named conduit and terminating in a nozzle in said first-named conduit to direct the gas mixture in said conduit in a predetermined direction of circulation, and an electrically operated mechanical means connected with said branch conduit for producing the gas pressure required for forcing a portion of said conduit gas through said nozzle.

3. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, an enclosed gas chamber connected with said nozzle and electrically operated mechanical means for varying periodically the volume of said gas chamber for drawing conduit gas through said nozzle into said space and for forcing it out through said nozzle back into said conduit in the desired circulating direction.

4. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and an electrically operated mechanical means for producing the gas pressure required for forcing a portion of said gas through said nozzle, comprising a closed gas chamber connected with said nozzle and having a diaphragm for closing said chamber to the outside, and electrical means for oscillating said diaphragm to periodically vary the volume of said gas chamber, for drawing conduit gas through said nozzle into said chamber and for forcing it out through said nozzle back into said conduit in the desired circulating direction.

5. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and an electrically operated mechanical means for producing the gas pressure required for forcing a portion of said gas through said nozzle, comprising a closed gas chamber connected with said nozzle and having a diaphragm for closing said chamber to the outside, and electrical means for oscillating said diaphragm to periodically vary the volume of said gas chamber, for drawing conduit gas through said nozzle into said chamber and for forcing it out through said nozzle back into said conduit in the desired circulating direction, said circulation conduit being enlarged into a chamber-like space at the portion surrounding said nozzle.

6. In an absorption refrigerating apparatus of the continuous type comprising a generator, a condenser, an evaporator and an absorber, and containing a refrigerating agent, and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and means for producing the gas pressure required for forcing a portion of said conduit gas through said nozzle, comprising a closed gas chamber connected with said nozzle, an oscillatably disposed disc for closing said gas chamber to the exterior, and an electrically energized magnet outside of said space for oscillating said disc continuously to periodically vary the volume of said chamber, said circulation conduit being enlarged at the portion surrounding said nozzle into a chamber-like space located in the path of said gas at a point where the flow of gas changes direction.

7. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and means for producing the gas pressure required for forcing a portion of said gas through said nozzle, comprising a closed gas chamber, connected with said nozzle and electrically operated mechanical means for varying periodically the volume of said gas chamber for drawing conduit gas through said nozzle into said chamber and for forcing it out through said nozzle back into said conduit in the desired circulating direction, and a centrally perforated disc disposed in said conduit in front of the outlet of said nozzle.

8. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas between said vessels, and an electrically operated diaphragm gas pump hermetically connected with said conduit for drawing in conduit gas and for forcing it back into said conduit in the direction of the other vessel to produce a gas circulation in said direction in the circulating system.

9. In an absorption refrigerating apparatus of the continuous type having a gas mixture circuit including an absorber an evaporator and tubular connections between said vessels, an electromagnetically operated oscillatory diaphragm exposed to the gas mixture in one of said tubular connections and hermetically sealed against the outside for impelling the gas contacting with the diaphragm in the direction of one of said vessels to maintain gas circulation between said vessels.

10. In an absorption refrigerating apparatus of the continuous type having a gas mixture circuit including an absorber an evaporator and tubular connections between said vessels, an electromagnetically operated diaphragm gas pump connected with one of said tubular connections and communicating with the gas mixture therein, for impelling the mixture by the diaphragm oscillations, and means disposed in said connection opposite to said diaphragm for guiding the impelled gas in a desired direction.

11. In an absorption refrigerating apparatus of the continuous type having a gas circuit containing a gas, and including an absorber, an evaporator and tubular connections between said vessels, a gas conveyor hermetically sealed to said gas circuit and comprising an electromagnetically operated oscillatory diaphragm exposed to the gas in one of said tubular connections, for impelling the gas contacting with the diaphragm in the direction of one of said vessels to produce movement of the gas from one vessel to the other.

PAUL SCHOLL.
CARL KÜHNEL.